United States Patent
Beach et al.

(10) Patent No.: US 10,338,698 B2
(45) Date of Patent: *Jul. 2, 2019

(54) INTERACTIVE INPUT CONTROLS IN A SIMULATED THREE-DIMENSIONAL (3D) ENVIRONMENT

(71) Applicant: SONY INTERACTIVE ENTERTAINMENT INC., Tokyo (JP)

(72) Inventors: James Beach, San Mateo, CA (US); Hao Chi, San Mateo, CA (US); Jin Zhang, San Mateo, CA (US); Mark Gadzikowski, San Mateo, CA (US); Dustin Boyle, San Mateo, CA (US); Jonathan Courney, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/219,708

(22) Filed: Dec. 13, 2018

(65) Prior Publication Data

US 2019/0113984 A1    Apr. 18, 2019

Related U.S. Application Data

(63) Continuation of application No. 15/641,720, filed on Jul. 5, 2017, now Pat. No. 10,191,566.

(51) Int. Cl.
*G06F 3/0346* (2013.01)
*G06T 19/00* (2011.01)
(Continued)

(52) U.S. Cl.
CPC .......... *G06F 3/0346* (2013.01); *G06T 19/003* (2013.01); *G06F 3/0482* (2013.01);
(Continued)

(58) Field of Classification Search
None
See application file for complete search history.

(56) References Cited

U.S. PATENT DOCUMENTS

| | | | |
|---|---|---|---|
| 8,384,665 B1 | 2/2013 | Powers et al. | |
| 2010/0113153 A1* | 5/2010 | Yen | A63F 13/06 463/37 |

(Continued)

FOREIGN PATENT DOCUMENTS

WO    WO 2019/010129    1/2019

OTHER PUBLICATIONS

PCT Application No. PCT/US2018/040604 International Search Report and Written Opinion dated Sep. 27, 2018.
U.S. Appl. No. 15/641,720 Office Action dated Jun. 7, 2018.

*Primary Examiner* — Duane N Taylor, Jr.
(74) *Attorney, Agent, or Firm* — Polsinelli LLP

(57) ABSTRACT

A virtual reality (VR) system supports improved interactive control processes/services. These interactive control processes/services include detecting movement of a controller associated with a virtual reality (VR) environment, determining an angle of rotation based on the movement, determining a magnitude of force associated with the movement, determining a path in the VR environment that corresponds to the angle of rotation and the magnitude of force, and projecting the path in the VR environment.

18 Claims, 13 Drawing Sheets

(51) Int. Cl.
    *G06F 3/0481*     (2013.01)
    *G06F 3/0482*     (2013.01)
    *G06T 13/20*     (2011.01)
    *G06F 3/0484*     (2013.01)

(52) U.S. Cl.
    CPC ...... *G06F 3/04815* (2013.01); *G06F 3/04842* (2013.01); *G06T 13/20* (2013.01)

(56) References Cited

U.S. PATENT DOCUMENTS

| | | |
|---|---|---|
| 2012/0178534 A1 | 7/2012 | Ferguson et al. |
| 2016/0300387 A1 | 10/2016 | Ziman |
| 2016/0357249 A1 | 12/2016 | Webb et al. |
| 2017/0228922 A1* | 8/2017 | Kaeser ............... G06F 3/04815 |
| 2017/0337742 A1* | 11/2017 | Powderly ............. G02B 27/01 |
| 2017/0358139 A1* | 12/2017 | Balan ................ G02B 27/0172 |
| 2017/0358141 A1* | 12/2017 | Stafford ............. G02B 27/017 |
| 2018/0004283 A1* | 1/2018 | Mathey-Owens ........................ G06F 3/04815 |
| 2018/0122043 A1* | 5/2018 | Energin ............. G06F 3/04845 |
| 2019/0011999 A1 | 1/2019 | Beach |

\* cited by examiner

INTERACTIVE INPUT CONTROLS IN A SIMULATED THREE-DIMENSIONAL (3D) ENVIRONMENT

CROSS-REFERENCE TO RELATED APPLICATIONS

The present application is a continuation and claims the priority benefit of U.S. patent application Ser. No. 15/641,720 filed Jul. 5, 2017, the disclosure of which is incorporated herein by reference.

FIELD OF THE INVENTION

The present disclosure generally relates to simulated or virtual reality environments, and more particularly to interactive input controls therein.

DESCRIPTION OF THE RELATED ART

Advances in technology, driven, for example, by improved processing power and speed, ever more efficient software rendering techniques, consumer convenience, and the like, have supported a growing movement in developing and designing simulated or three-dimensional (3D) virtual reality (VR) environments. VR systems which support such VR environments generally include hardware such as headsets, goggles, handheld or wearable devices, and the like. Operatively, such hardware continuously tracks user movements, updates user positions, orientations, and the like, and receives interactive input from users in a VR environment.

While certain VR systems can include complex and often expensive hardware and other equipment, such as an omnidirectional treadmill, for tracking and translating real-world user movement into the VR environment, an average user may not have requisite capital (or physical space) to support such complex and often expensive equipment. Accordingly, certain challenges arise when designing and creating intuitive and interactive controls for users in a VR environment. Therefore, there is a need for improved interactive processes and techniques operable by simple VR equipment.

SUMMARY OF THE PRESENTLY CLAIMED INVENTION

In one exemplary embodiment, this disclosure provides an interactive control process/service. The interactive control process/service may be performed as a method of steps that include detecting movement of a controller associated with a virtual reality (VR) environment. The method further includes steps to determine an angle of rotation, a magnitude of force (e.g., acceleration), and the like, based on the movement. For example, the movement may be mapped or represented by vectors, each having a direction and a magnitude. The method further includes steps for determining a path in the VR environment that corresponds to the vectors (e.g., the angle(s) of rotation, magnitudes of force, etc.) as well as for projecting the path in the VR environment, by displaying, for example, graphical elements that represent the path in the VR environment. In some aspects the method may further include intersection or collision processes that determine when an object in the VR environment intersects (or is in close proximity to) a portion of the path. In such aspects, the method may further include steps to modify or adjust the path so as to select such object, display menu options, retrieve the object along the path, move the user toward the object along the path, and the like.

In another embodiment, a virtual reality (VR) system employs the above discussed interactive control process/service. For example, the VR system includes a network interface to communicate in a communication network, a processor coupled to the network interface and adapted to execute one or more processes, and a memory configured to store a process executable by the processor. The process, when executed by the processor, is operable to detect movement of a controller associated with a virtual reality (VR) environment and determine angles of rotation, magnitudes of force (e.g., acceleration), and the like, based on the movement. The VR system further determines a path in the VR environment that corresponds to the movement and projects the path in the VR environment (e.g., displays graphical objects/elements that represent the path, etc.).

In yet another embodiment, a tangible, non-transitory, computer-readable media includes software or instructions such as an exemplary interactive control process. The software/instructions are executed by a processor, which causes the processor to detect movement of a controller associated with a virtual reality (VR) environment and determine angles of rotation, magnitudes of force (e.g., acceleration), and the like, based on the movement. The processor also determines a path in the VR environment that corresponds to the movement and projects the path in the VR environment (e.g., displays graphical objects/elements that represent the path, etc.).

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As discussed in herein, the subject disclosure relates to interactive controls particularly suitable for virtual reality (VR) environments. These interactive controls are employed by simple controllers without requiring complex and often expensive equipment. For example, the interactive controls may include an interactive control process/service that can be employed by simple controllers, head-sets, and/or VR consoles. Such interactive control process may, for example, detect movement of a controller associated with a virtual reality (VR) environment and includes steps to determine angles of rotation, magnitudes of force (e.g., acceleration), and the like, based on the movement. For example, the interactive control process may map or assign portions of the movement to vectors in a coordinate system and determine a path in the VR environment that corresponds to the vectors (e.g., based on averages, unions, differences, superposition, or other combinations of vectors/vector-elements). The path may be used as a guide to move the user in the 3D environment and/or as a selection tool to select or retrieve objects as discussed in greater detail below.

Figure 1:
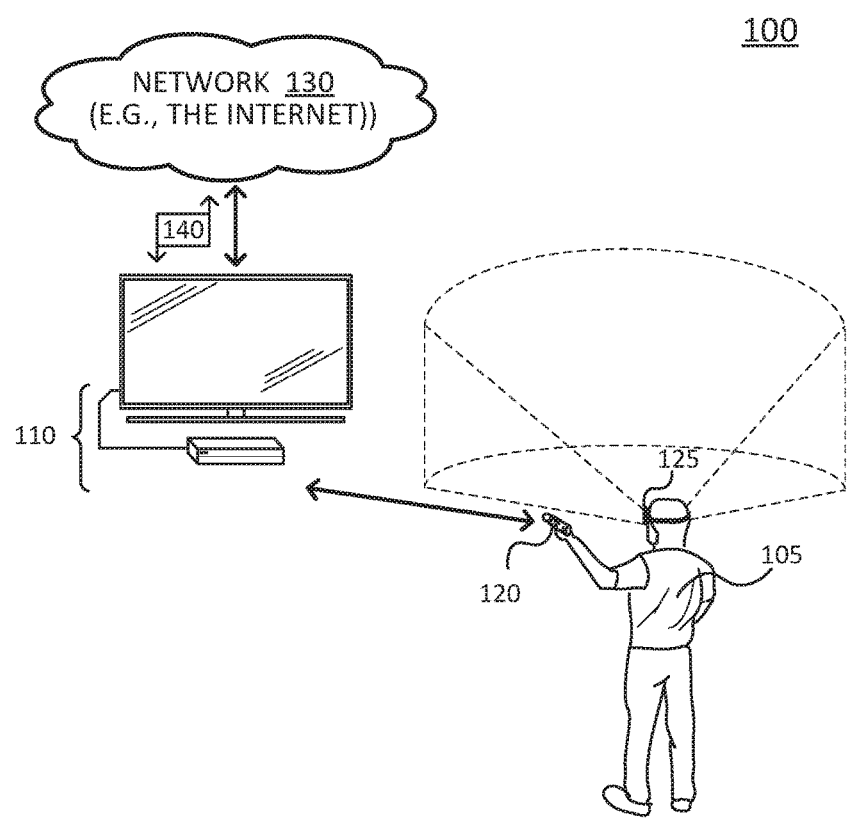
FIG. 1 illustrates a schematic diagram of an example Virtual Reality (VR) environment.

Referring now to the figures, FIG. 1 illustrates a schematic diagram of a Virtual Reality (VR) environment 100. VR environment 100 includes various devices, components, sub-components, hardware/software, interfaces, and the like, which collectively operate form a VR system that provides an immersive and interactive simulated experience to a user 105.

As shown, VR environment 100 includes equipment such as a console 110, controller(s) 120, and a headset 125. Console 110 represents centralized hardware/software that communicates with controller 120 and/or headset 125, as well as communicates with various other devices, servers, databases, and the like over a communication network 130 (e.g., the Internet), as is appreciated by those skilled in the art.

Communication network 130 represents a network of devices/nodes interconnected over network interfaces/links/segments/etc. and operable to exchange data such as a data packet 140 and transport data to/from end devices/nodes (e.g., console 110, controller 120, and/or headset 125).

Data packets 140 include network traffic/messages which are exchanged between devices over communication network 130 using predefined network communication protocols such as certain known wired protocols, wireless protocols (e.g., IEEE Std. 802.15.4, WiFi, Bluetooth®, etc.), PLC protocols, or other shared-media protocols where appropriate.

Controller 120 wirelessly communicates with console 110 over network 130, or (in some embodiments) it may be coupled to console 110 over another network (not shown). Controller 120 facilitates user interaction with and within VR environment 100 and is operable to, for example, detect, track, or otherwise monitor movement and biometric information, communicate data signals with headset 125 and console 110, and provide feedback (e.g., tactile, audible, etc.) to a user 105. In this fashion, controller 120 can comprise any number of sensors, gyros, radios, processors, touch detectors, transmitters, receivers, feedback circuitry, and the like.

Headset 125, similar to controller 120, wirelessly communicates with console 110. Headset 125 displays or projects simulated graphical elements that form simulated VR environments to user 105, tracks eye movements, and measure biometric data from user 105.

With respect to the devices discussed above, it is appreciated that certain devices may be adapted to include (or exclude) certain functionality and that the components shown are shown for purposes of discussion, not limitation. As discussed, console 110, controller 120, and headset 125 cooperate to provide an immersive and interactive VR environment to user 105.

Figure 2:
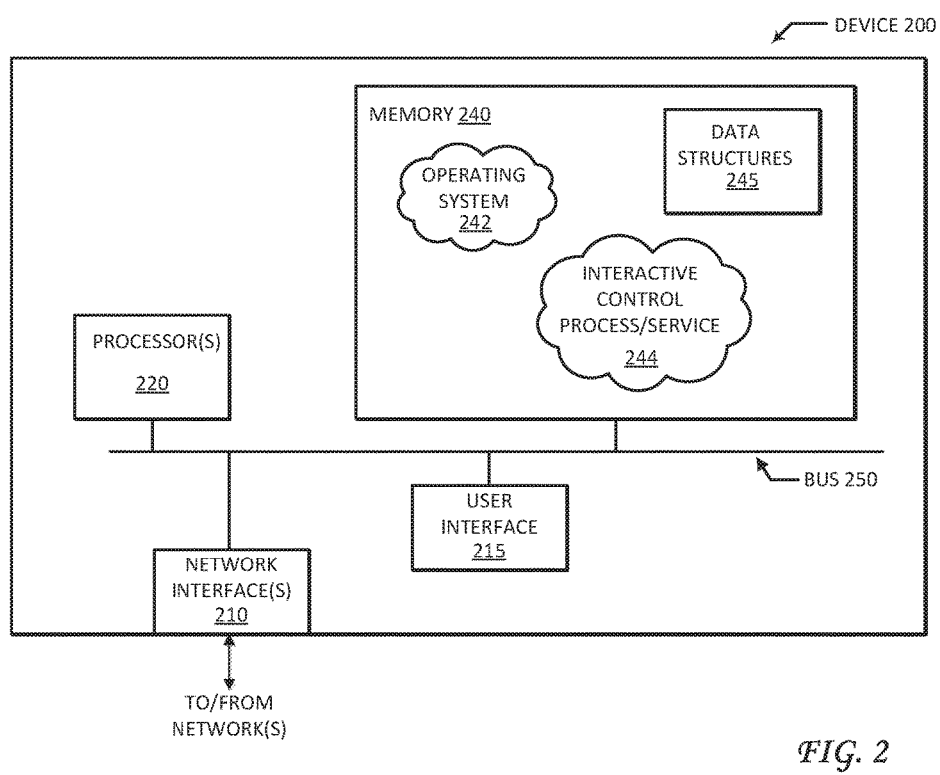
FIG. 2 illustrates a block diagram of an example VR device/node.

FIG. 2 illustrates a block diagram of an example device 200 that represents one or more devices shown in FIG. 1 (e.g., console 110, controller 120, headset 125, etc.). Device 200 includes one or more network interfaces 210, an input interface 215, a processor 220, and a memory 240 interconnected by a system bus 250.

Network interface(s) 210 contain mechanical, electrical, and signaling circuitry for communicating data between devices over a network such as communication network 130. Input interface 215 includes hardware/software that receives user commands, and detects movement or gestures, and may also be configured to provide user-feedback (e.g., tactile, visual, audio, etc.). For example, input interface 215 can include switches, buttons, accelerometers, sensors, processors, radios, display elements, and the like. Memory 240 comprises a plurality of storage locations that are addressable by processor 220 for storing software programs and data structures associated with the embodiments described herein.

Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of software processes and/or services executing on the device. These software processes and/or services may comprise an illustrative "interactive control" process/service 244. Note that while process/service 244 is shown in centralized memory 240, it may be configured to operate in a distributed network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having interactive control process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

Figure 3:
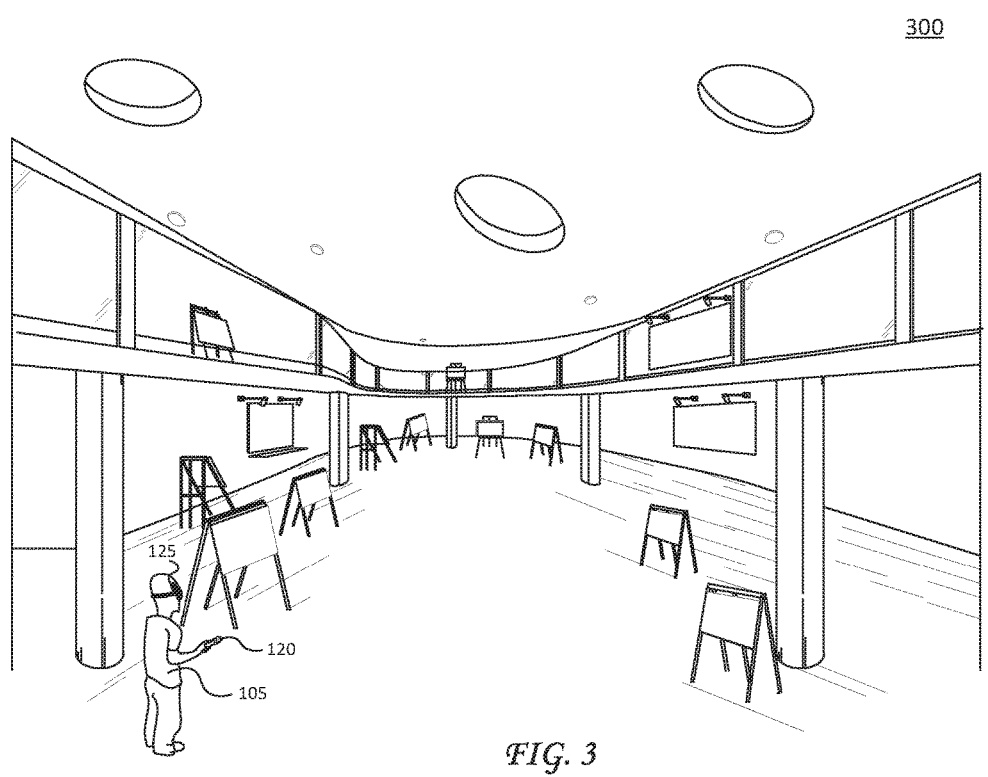
FIG. 3 illustrates a block diagram of a VR environment, viewed from a third person perspective view of a user.

FIG. 3 illustrates a block diagram of a VR environment 300, particularly showing a simulate art gallery from the third person perspective view of user 105. As mentioned, user 105 experiences and interacts with VR environment 300 using headset 125 and controller 120. However, as discussed above, certain challenges arise when designing intuitive and interactive controls for VR environments, such as VR environment 300, especially when designing controls operable by relatively simple and inexpensive controller components—here, controller 120 and/or headset 125. Accordingly, the processes and techniques of this disclosure include improved interactive controls, particularly suitable for VR environments and for such relatively simple and inexpensive controller components.

Figures 4A, 4B:
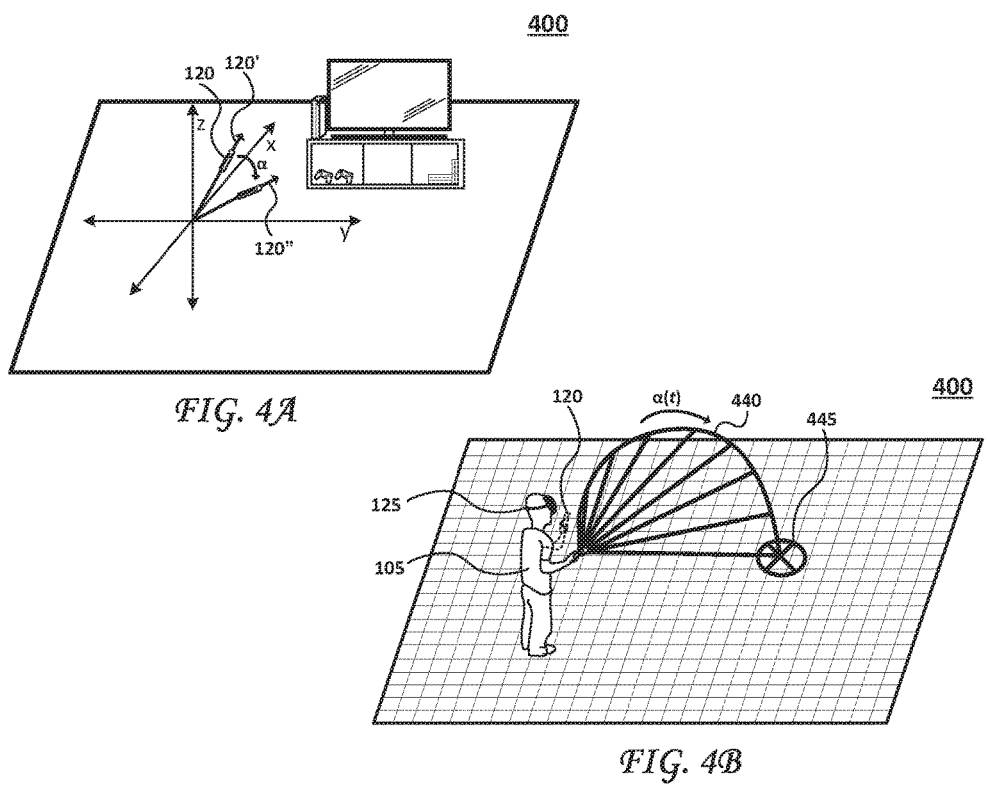
FIG. 4A illustrates a third person point of view of another VR environment, showing movement of a controller that supports user interaction with and within the VR environment.
FIG. 4B illustrates the third person point of view of the VR environment of FIG. 4A, as displayed to a user, showing a path resulting from the movement shown in FIG. 4A.

FIGS. 4A and 4B each illustrate a third person point view of a VR environment 400, and show movement by controller 120 as well as a path resulting from the movement, respectively.

FIG. 4A particularly illustrates movement of controller 120 from a first position to a second position within a three-dimensional (3D) coordinate system. The movement of the controller, between the first position and the second position, includes a change in controller orientation or direction, indicated by an angle "α", as well as a change in acceleration, indicated by a magnitude of a corresponding vector. With respect to corresponding vectors, the first position and the second position of controller 120 are represented in vector form—i.e., vector 120' and vector 120"—which include a respective direction and magnitude, where the magnitude represents a force measured at the respective position. In this fashion, controller 120 monitors and measures changes in orientation, position, angular momentum, acceleration, and the like, and further performs or executes the interactive control processes/services (e.g., interactive control process 244), as described herein.

FIG. 4B particularly shows a path 440 that results from the movement of controller 120 from the first position to the second position. Path 440 originates at a current location of user 105, follows an arc (which is determined by a change in angle α over time), ends at a terminal location indicated by an anchor point 445 (a graphical display element ("X")), and is projected to user 105 by headset 125. Path 440 can represent a travel path that guides movement of user 105 in the VR environment and/or it can represent a selection path that selects objects intersecting therewith.

In operation, controller 120 detects movement from the first position to the second position, determines an angle of rotation (a) based on the movement, and determines a magnitude of force (e.g., an acceleration force, etc.) associated with the movement and/or the respective positions. Controller 120 further determines a path in the VR environment—here, path 440—that corresponds to the angle of rotation and the magnitude of force and headset 125 projects the path to user 105 in the VR environment. While the foregoing operations are described with respect to specific devices/controllers it is appreciated that any combination of devices may perform the same or substantially similar functionality.

Figure 5:
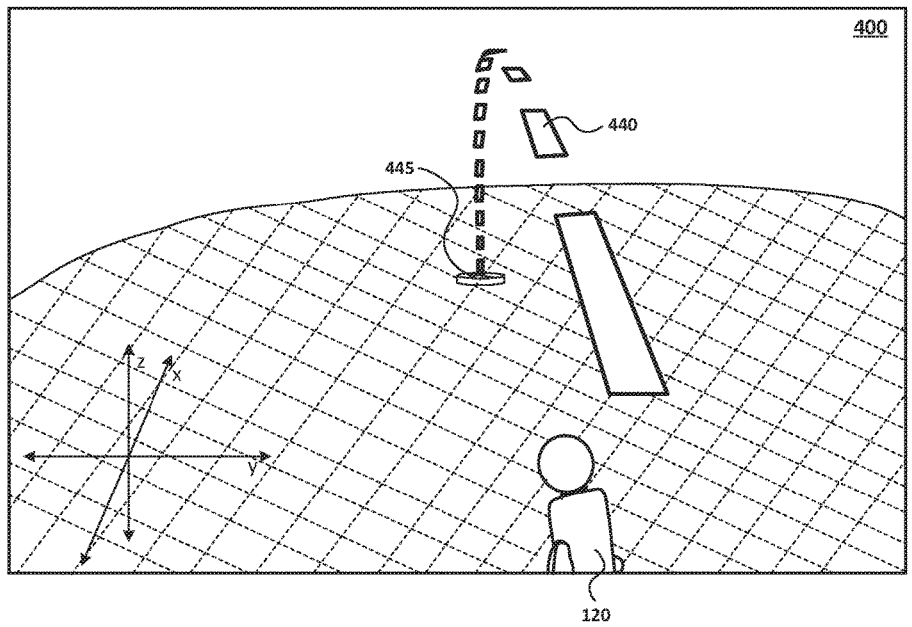
FIG. 5 illustrates a first person point of view by the user in the VR environment, showing the path shown in FIG. 4B.

FIG. 5 illustrates a first person point view of VR environment 400, viewed from the perspective of user 105 wearing headset 125. Here, VR environment 400 is illustrated with a grid pattern that represents a coordinate system overlaying a bounding plane or surface (e.g., a ground surface).

As discussed, the movement of controller 120 from the first position to the second position may be mapped into a 3D coordinate system where vectors represent respective direction and magnitude at each position. The 3D coordinate system may further include a real-world coordinate system and/or a VR environment coordinate system. With respect to the real-world coordinate system, additional processing may be needed to translate the movement and calculate the path resulting therefrom into the VR environment coordinate system.

As shown here, path 440 is represented by a graphical dash line that terminates in a 3D graphical "X" element, which represents anchor point 445, and controller 120 is represented by a 3D graphical controller element. Collectively, these graphical components/elements show an exemplary a first person perspective view of user 105 within VR environment 400. As mentioned, path 440 is calculated, in part, from changes in controller orientation as well as changes in force (e.g., acceleration). In one embodiment, path 440 represents a curved path or an arcing path and may be generated by a simulated casting motion similar to casting, for example, a fishing line. The distance and direction of the curved path are derived by the above mentioned changes in controller orientation/force, as is appreciated by those skilled in the art. Notably, in some embodiments, the casting motion may operate in conjunction with other input controls (e.g., button press/release/etc.) to indicate the user's intention to generate path 440 in environment 400.

Figure 6:
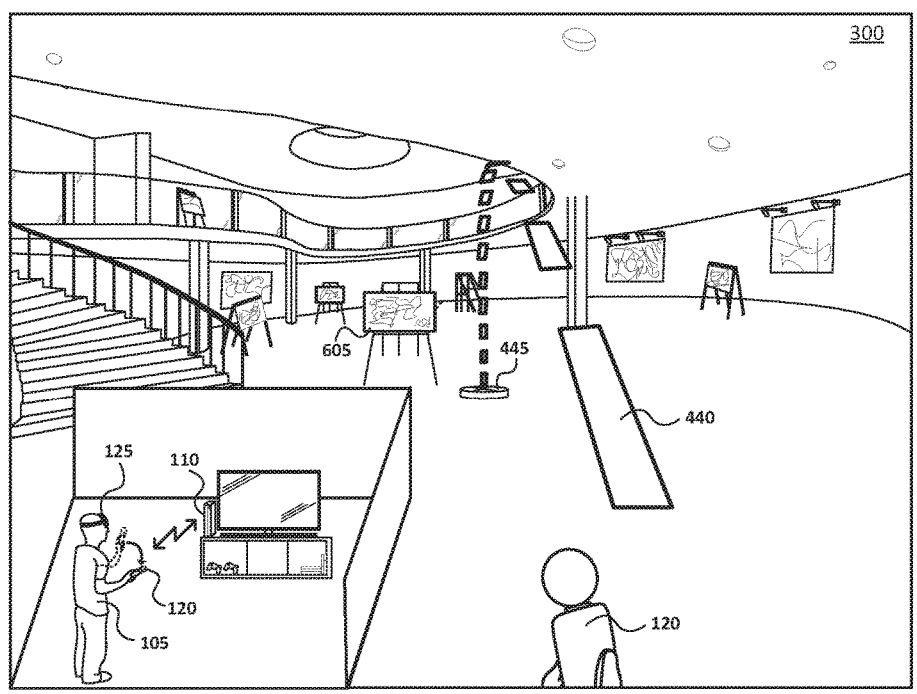
FIG. 6 illustrates a first person point of view of the VR environment in FIG. 3, showing a path from the user to a position in the VR environment.

FIG. 6 illustrates a first person point of view of VR environment 300, particularly from the perspective of user 105. Here, user 105 moved controller 120 from the first position to the second position (as discussed above), and controller 120 (and/or other hardware components) determined a resultant a path—i.e., path 440—which is displayed to user 105 by headset 125. Path 440 represents a travel path in VR environment 300 that guides movement of user 105 from a current position to the anchor point 445. Notably, in FIG. 6, path 440 moves user 105 closer to an interactive object 605—i.e., a painting. As is appreciated by those skilled in the art, user 105 may provide additional input to prompt subsequent movement along path 440 in VR environment 300. Such subsequent movement along the path may be graphically projected/animated for user 105 by headset 125, as is appreciated by those skilled in the art.

Figure 7:
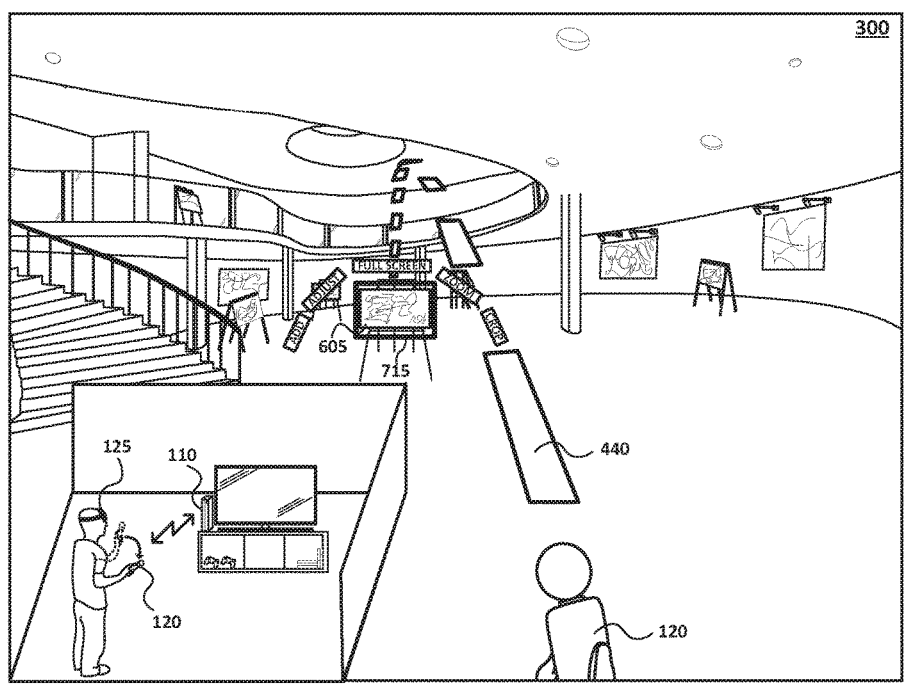
FIG. 7 illustrates the first person point of view of the VR environment of FIG. 6, showing the path intersecting with an object and selection of the object.

FIG. 7 illustrates the first person point of view of VR environment 300 in FIG. 6, further showing path 440 intersecting interactive object 605. In addition to calculating a path based on the movement of controller 120, the interactive control process or techniques (e.g., interactive control process 244) may incorporate object intersection processes that detect an intersection (or collision) between portions of the path and objects in the VR environment. Alternatively (or in addition), the intersection may include fuzzy logic to detects proximate intersection/collision as well as actual intersection. Here, the interactive control process determines portions of path 440 intersect (or are proximate to intersection) with interactive object 605. Due to such intersection (or proximate intersection), path 440 may be modified to help user 105 select interactive object 605 and/or call up additional menu options (example options include "add", "adjust", "full screen", "zoom", "crop", and the like). In addition, VR environment 300 also provides a selection element or border 715 that indicates selection of interactive object 605.

Here, path 440 represents a selection path that selects interactive object 605. The selection path may guide movement between the user and the selected object in the VR environment and/or the selection path may retrieve the selected object to the user (e.g., move the object from its current location to a current location of the user). As is appreciated by those skilled in the art, user 105 may provide additional input to prompt subsequent movement of the user and/or the object in VR environment 300.

Figures 8A, 8B:
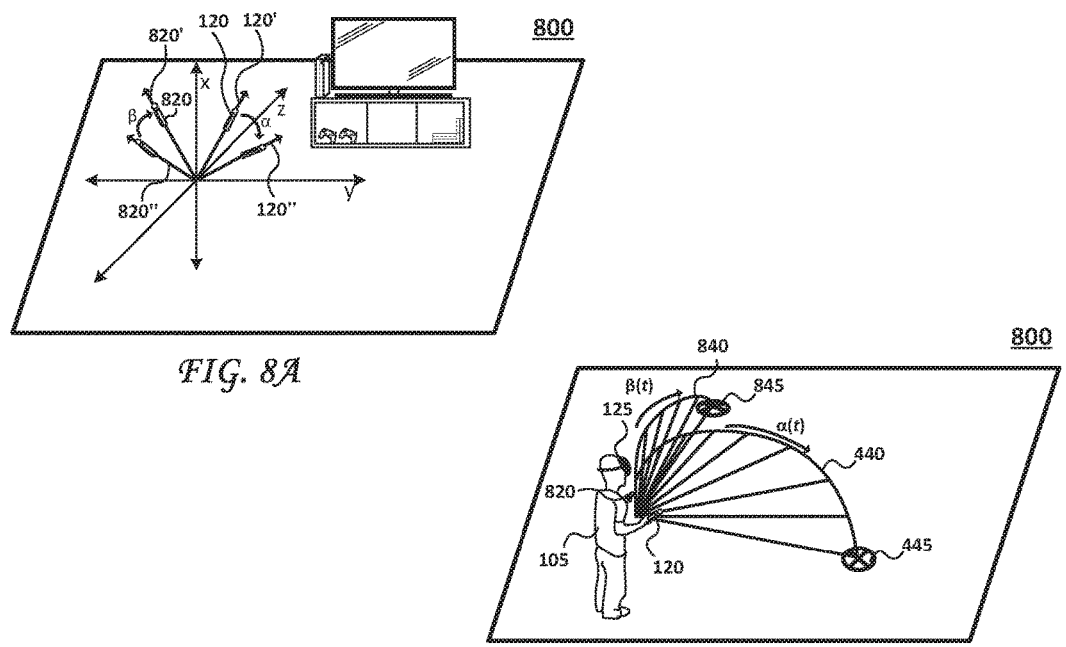
FIG. 8A illustrates a third person point of view of another VR environment, showing movement of two controllers that each support user interaction with and within the VR environment.
FIG. 8B illustrates the third person point of view of the VR environment of FIG. 8A, showing a user moving each controller and a respective resultant path.

FIG. 8A illustrates a third person point of view of another VR environment, showing movement of two controllers that each support user interaction with and within the VR environment;

FIGS. 8A and 8B each illustrate a third person point view of a VR environment 800, where FIG. 8A shows movement by two controllers—controller 120 and a controller 820—in a three-dimensional (3D) coordinate system and FIG. 8B shows respective paths resulting from the movements. The movement of controller 120 in FIGS. 8A and 8B is the same as the movement of controller 120 shown in FIGS. 4A and 4B, discussed above. Accordingly, discussion with respect to FIGS. 8A and 8B below focuses on a second controller—controller 820—and its movement.

FIG. 8A specifically illustrates controller 120 movement from a first position to a second position and controller 820 movement from a respective first position to a second position. The respective movements of each controller include a change in controller orientation or direction, indicated by an angle "α" (for controller 120) or angle "β" (for controller 820), as well as respective changes in acceleration, indicated by corresponding vectors.

With respect to corresponding vectors, in addition to vectors 120' and 120" which correspond to controller 120, FIG. 8A also provides vectors 820' and 820", which correspond to the first position and the second position of controller 820 and show directions and magnitudes. As discussed above, the magnitude represents a force measured at a respective position.

FIG. 8B particularly shows paths resulting from the respective movements of each controller. Specifically, in addition to path 440 (corresponding to controller 120), FIG. 8B also illustrates a path 840 that originates at a current location of user 105, follows an arc (which is determined by a change in angle β over time), ends at a terminal location indicated by an anchor point 845 (a graphical display element ("X")), and is projected to user 105 by headset 125. Path 840, similar to path 440, can represent a travel path that guides movement of user 105 in the VR environment and/or it can represent a selection path that selects objects intersecting therewith.

In operation, controllers 120, 820 detect respective movements, determine an angle of rotation (α, β) based on the movement, and determine a magnitude of force (e.g., an acceleration force, etc.) associated with the movement and/or the respective positions. Controllers 120, 820 further determine a respective path in the VR environment—path 440, 840—that corresponds to the respective angles of rotation and magnitudes of force.

Figure 9A:
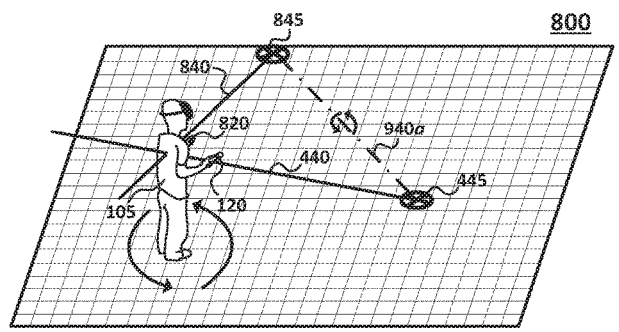
FIG. 9A illustrates the third person point of view of the VR environment of FIG. 8B, showing each path terminating in an anchor point and VR interactions with respect to each anchor point.
Figure 9B:
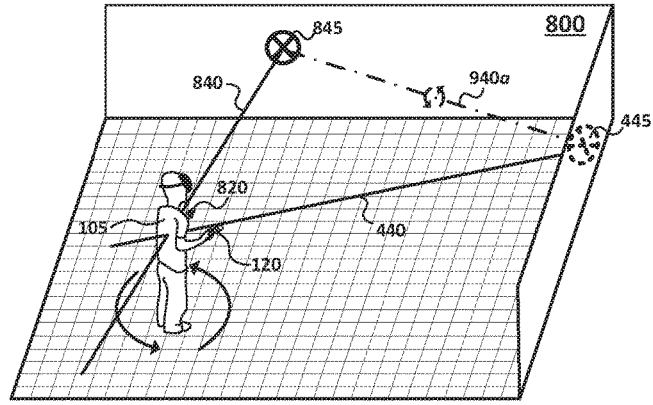
FIG. 9B illustrates the third person point of view of the VR environment of FIG. 8B, showing each path terminating in an anchor point positioned on a wall surface in the VR environment and optional interactions with respect to each anchor point.

FIGS. 9A and 9B illustrate the third person point of view of the VR environment of FIG. 8B, showing each path terminating in respective anchor points and corresponding VR interactions. In particular, FIG. 9A illustrates path 440 and path 840 as a straight line that intersects user 105 and respective anchor points 445, 845 positioned on a ground surface, while FIG. 9B illustrates path 440 and path 840 as a straight line that intersects user 105 and respective anchor points 445, 845 positioned on a wall surface in VR environment 800.

As discussed above, the paths 440, 840 may represent travel paths to guide movement of user 105 in the VR environment. While embodiments having one controller and one travel path (as well as corresponding interactive operations) are discussed above, here, a synergy exists between multiple paths—i.e., path 440 and path 840—that supports further interactive operations. In particular, an analogy may be made to operating a kite with two strings, whereby each path represents one string (or a cable) and the kite is represented by a fixed bounding surface (a ground surface in FIG. 9A and a wall surface in FIG. 9B). In addition, an axis of rotation 940a may be defined between terminal or anchor points 445, 845. In operation, user 105 may control his movement relative to the anchor points (on the ground surface) and input corresponding tugging or pulling motions/gestures into controllers 120, 820. The tugging or pulling motions, which are detected by each controller, cooperate and can move user 105 along/between paths 440, 840. In addition, such motions (and/or other defined motions) can rotate or adjust an orientation of user about axis 940a with respect to VR environment 800.

Figure 10:
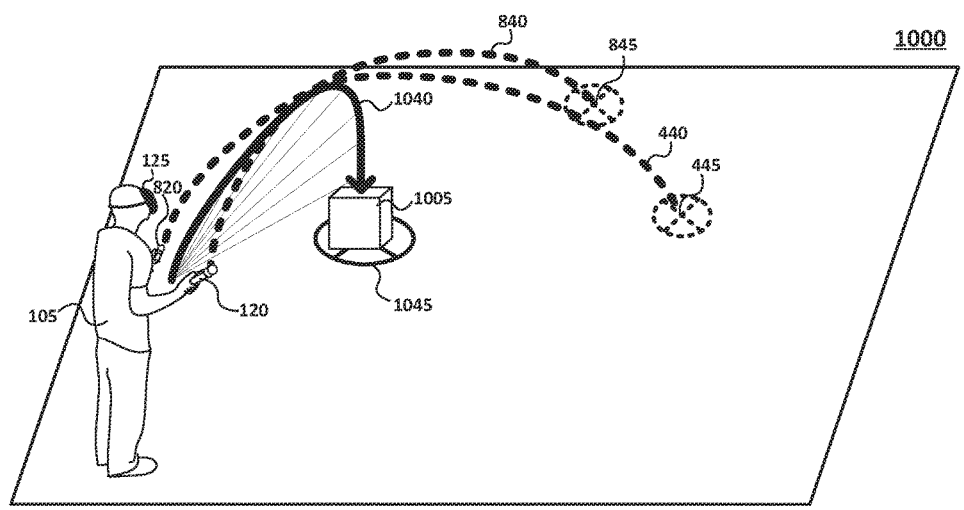
FIG. 10 illustrates a third person point of view of another VR environment, showing a selection path derived from movement of two controllers.

FIG. 10 illustrates a third person point of view of another VR environment, showing a selection path 1040 derived from movements by controller 120 and controller 820. Here, selection path 1040 can represent a superposition of path 440 and path 840, where portions of both paths cancel and other portions aggregate. Alternatively (or in addition), selection path 1040 may also represent an average, a difference, a union, or some other combination of paths 440 and 840, as is appreciated by those skilled in the art. Moreover, as mentioned above, the interactive control process (employed in conjunction with two controllers) may also incorporate object intersection/collision processes that detect an intersection (or a location proximate to the intersection) between an object (an interactive object 1005) and the selection path derived from movement of both controllers. In some embodiments, similar to those discussed above, the selection path 1040 may represent a travel path that terminates in an anchor point 1045 for guiding movement of user 105 in VR environment 1000.

Figure 11A:
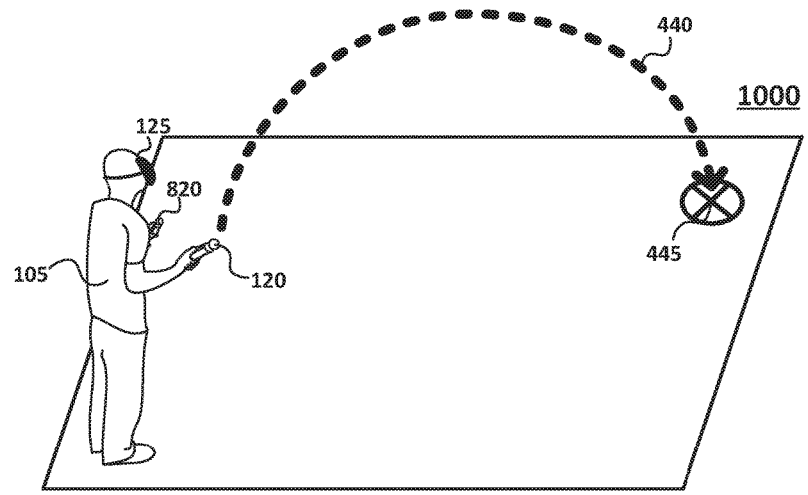
FIGS. 11A and 11B illustrate a third person point of view of the VR environment of FIG. 10, showing an initial path resulting by movement of a first controller and an adjustment to the initial path resulting from movement of a second controller.
Figure 11B:
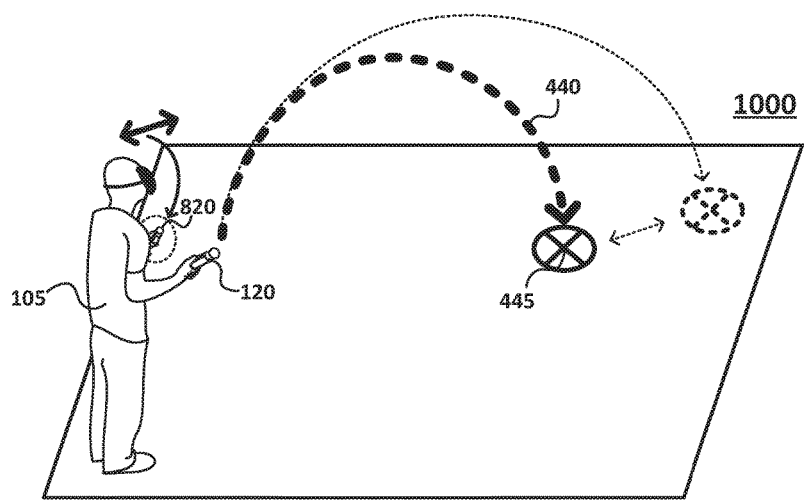

FIGS. 11A and 11B illustrate a third person point of view of VR environment 1000, showing an initial path (path 440) resulting by movement of controller 120 (FIG. 11A) and an adjustment to the initial path resulting from movement of controller 820 (FIG. 11B). Collectively, FIGS. 11A and 11B illustrate additional functionality of the interactive control processes where user 105 moves controller 120 to generate a path 440 (discussed in greater detail above) and moves controller 820 to adjust or fine-tune aspects of path 440 (e.g., adjust a direction, magnitude, orientation, etc.). For example, as shown, path 440 is generated in FIG. 11A and is located at an initial distance from user 105. User 105 further moves and/or rotates controller 820 in FIG. 11B to adjust path 440—e.g., move anchor point 445 closer to a current location of user 105.

Figure 12A:
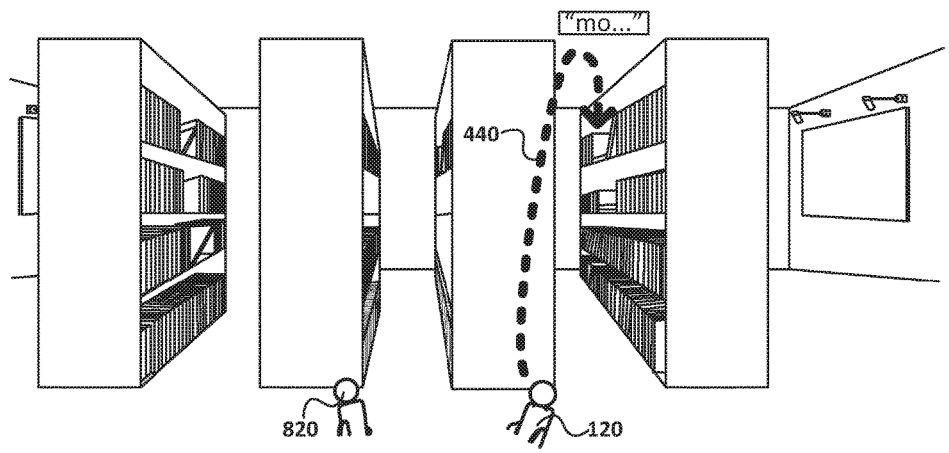
FIGS. 12A and 12B illustrate a first person point of view of the VR environment of FIG. 10, and correspond to the third person point of views shown in FIGS. 11A and 11B, respectively.
Figure 12B:
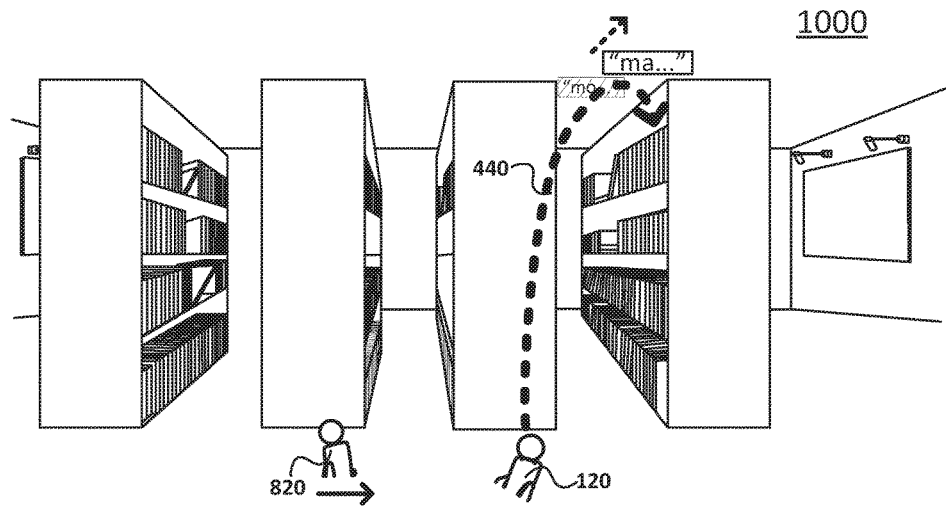

FIGS. 12A and 12B illustrate a first person point of view of FIGS. 11A and 11B, respectively. Here, VR environment 1000 shows a library with a number of books arranged on shelves. User 105 moves controller 120 (FIG. 12A) to generate path 440, which terminates on/near authors of books beginning with "mo . . . ". User 105 further moves controller 820 (indicated by a side arrow) to modify, adjust, or otherwise move path 440 so it terminates on/near authors of books beginning with "ma . . . ". In this fashion, one controller may be used to generate a travel/selection path while a second controller may be used to fine-tune or otherwise adjust the travel/selection path.

Figure 13:
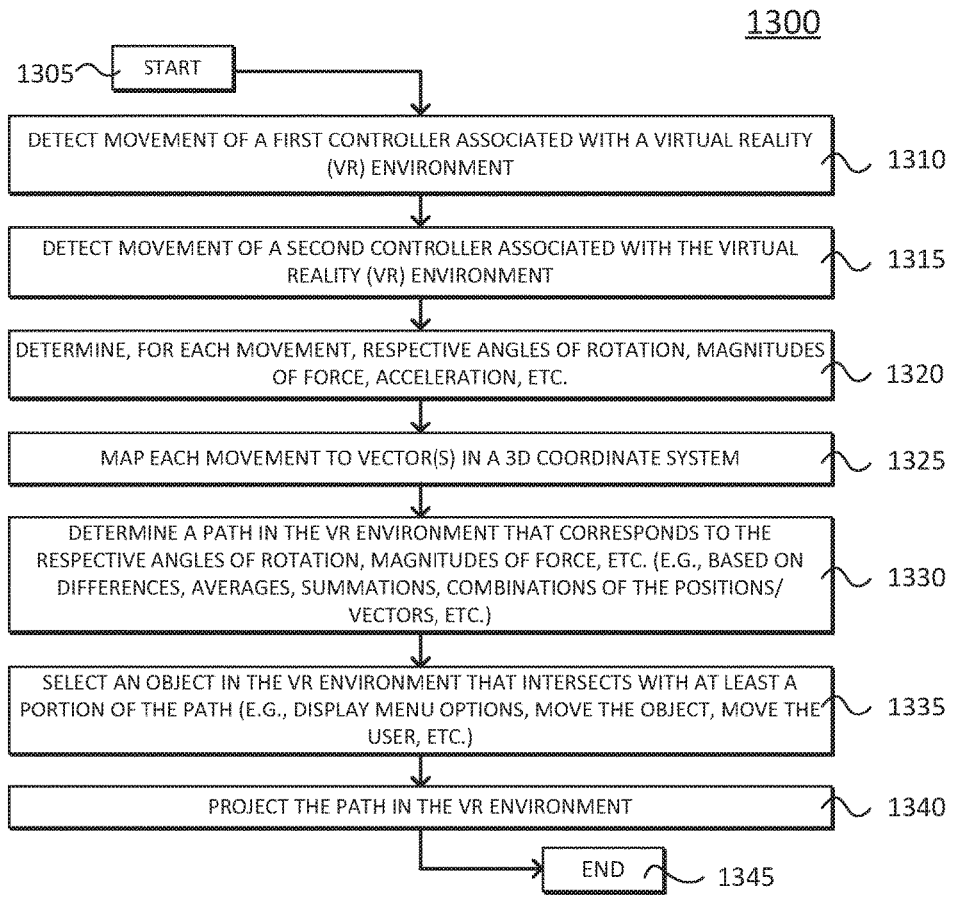
FIG. 13 illustrates an example simplified procedure of an interactive control process employed by a VR system.

FIG. 13 illustrates an example simplified procedure 1300 of an interactive control process employed by a VR system (or components thereof). Procedure 1300 begins at step 1305 and continues to steps 1310 and 1315, where, as described in greater detail above, a VR system detects movement of a first controller (e.g., controller 120) and a second controller (e.g., controller 820). The VR system further determines, at step 1320, for each movement, respective angles of rotation, magnitudes of force applied, accelerations, and the like. Based on the foregoing determinations, the VR system maps, in step 1325, each movement to one or more vectors in a three-dimensional (3D) coordinate system.

The VR system also determines, in step 1330, a path for the VR environment that corresponds to the one or more vectors (e.g., angles of rotation, magnitudes of force, etc.). For example, the VR system can derive the path based on an average, differences, summations, or other combinations of the vectors, which correspond to respective angles of rotation, magnitudes of forces (changes of force over time), etc., as is appreciated by those skilled in the art.

Procedure 1300 continues to step 1335 where, as discussed above, the VR system detects an intersection between portions of the path and an object in the VR environment and selects the object. As mentioned, selecting the object may further cause the object to be indicated as selected (e.g., a bounding box), display menu options associated with the object, retrieving or moving the object to a current position of the user or moving the user toward the object. The VR system further projects (e.g., using headset 125) the path in the VR environment such as the figures illustrate for paths 440/830.

Procedure 1300 subsequently ends at step 1345, but may begin again at step 1310 where it detects movement of the first controller. Collectively, the steps in procedure 1300 describe interactive control processes and techniques particularly suitable for VR environments without requiring expensive and often complex equipment. It should be noted that certain steps within procedures 1300 may be optional, and further, the steps shown in FIG. 13 are merely examples for illustration. Certain other steps may be included or excluded as desired. Further, while a particular order of the steps is shown and executed from the perspective of a particular device or system, this ordering is merely illustrative, and any suitable arrangement of the steps and/or any number of systems, platforms, or devices may be utilized without departing from the scope of the embodiments herein.

The techniques described herein, therefore, provide interactive control processes that compliment immersive simulated VR environments without requiring expensive and complex equipment. These interactive controls define simple and intuitive gestures that quickly and efficiently learned by any user.

While there have been shown and described illustrative embodiments of the interactive control processes for VR environments, it is to be understood that various other adaptations and modifications may be made within the spirit and scope of the embodiments herein. For example, the embodiments and certain functionality have been shown and described herein with relation to certain systems, platforms, hardware, devices, and modules. However, the embodiments in their broader sense are not as limited, and may, in fact, be employed in non-VR environments as well as employed by any combination of the devices or components discussed herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method for interactive movement within a virtual environment, the method comprising:
    determining a first anchor point of a first path within a virtual reality (VR) environment based on a movement of a first controller, the first path starting at a position of a perspective of a user within the VR environment and ending at the first anchor point on a surface of the VR environment;
    determining a second anchor point of a second path within the VR environment based on a movement of a second controller, the second path starting at the position of the user perspective within the VR environment and ending at the second anchor spot on a different surface of the VR environment;
    calculating an intersection point within the VR environment based on the first anchor point and the second anchor point, wherein the intersection point is located on a line that connects the first anchor point and the second anchor point within the VR environment; and
    detecting a subsequent interaction with the VR environment from one of the first controller or the second controller, wherein the subsequent interaction directs the user perspective within the VR environment to move towards the calculated intersection point.

2. The method of claim 1, wherein a different interaction from the user using one of the first controller or the second controller directs selection of an object in the VR environment located at the calculated intersection point.

3. The method of claim 1, wherein the first and second controllers measure changes in one or more of: orientation, position, force, angular momentum, and acceleration.

4. The method of claim 3, wherein the first and second controllers measure changes in conjunction with another input control, wherein the other input control is used to generate the first path and the second path in the VR environment.

5. The method of claim 1, further comprising displaying the first and second paths, the first and second anchor points, and the intersection point within the VR environment.

6. The method of claim 1, wherein a length of the first path from the position of the user perspective corresponds to a magnitude of a force that is measured by the first controller.

7. The method of claim 1, wherein a direction of the first path from the position of the user perspective corresponds to an orientation that is measured by the first controller.

8. The method of claim 1, wherein detecting subsequent interaction with the VR environment includes detecting gestures from at least one of the first controller or the second controller.

9. The method of claim 1, wherein movement of the user perspective towards the calculated intersection point is done along a third path, the third path being between the first and second paths.

10. The method of claim 1, further comprising displaying the VR environment on a VR headset worn by the user.

11. The method of claim 1, wherein the detected subsequent interaction with the VR environment includes button presses from at least one of the first controller or the second controller.

12. The method of claim 1, further comprising:
    detecting an intersection pertaining to the first or second paths with an object in the VR environment, and
    receiving a different subsequent interaction from the user using one of the first controller or the second controller to select the object.

13. The method of claim 12, wherein selection of the object includes retrieving additional menu options associated with the selected object.

14. The method of claim 12, wherein a selection element or border is provided to indicate that the object is being selected by the user.

15. The method of claim 1, further comprising:
    detecting proximate intersections pertaining to the first or second paths with an object in the VR environment, and
    receiving a different subsequent interaction from the user using one of the first controller or the second controller to select the object.

16. The method of claim 1, wherein the first path and the second path within the VR environment is a vector representation of the movement of the first controller and the second controller, respectively.

17. A virtual reality (VR) system for interactive movement within a VR environment, the system comprising:
    a network interface that communicates in a communication network;
    a first controller and a second controller; and
    a processor coupled to the network interface, wherein the processor executes instructions stored in memory to:
        determine a first anchor point of a first path within the VR environment based on a movement of the first controller, the first path starting at a position of a perspective of a user within the VR environment and ending at the first anchor point on a surface of the VR environment away;
        determine a second anchor point of a second path within the VR environment based on a movement of the second controller, the second path starting at the position of the user perspective within the VR environment and ending at the second anchor spot on a different surface of the VR environment away;
        calculate an intersection point within the VR environment based on the first anchor point and the second anchor point, wherein the intersection point is located on a line that connects the first anchor point and the second anchor point within the VR environment; and
        detect a subsequent interaction with the VR environment from one of the first controller or the second controller, wherein the subsequent interaction directs the user perspective within the VR environment to move towards the calculated intersection point.

18. A non-transitory, computer-readable storage media having software encoded thereon, the software executable by a processor to perform a method for interactive movement within a virtual environment, the method comprising:

determining first anchor point of a a first path within a virtual reality (VR) environment based on a movement of a first controller, the first path starting at a position of a perspective of a user within the VR environment and ending at the first anchor point on a surface of the VR environment;

determining a second anchor point of a second path within the VR environment based on a movement of a second controller, the second path starting at the position of the user perspective within the VR environment and ending at the second anchor spot on a different surface of the VR environment;

calculating an intersection point within the VR environment based on the first anchor point and the second anchor point, wherein the intersection point is located on a line that connects the first anchor point and the second anchor point within the VR environment; and detecting a subsequent interaction with the VR environment from one of the first controller or the second controller, wherein the subsequent interaction directs the user perspective within the VR environment to move towards the calculated intersection point.

* * * * *